United States Patent
Sumiya

(10) Patent No.: US 12,087,327 B2
(45) Date of Patent: Sep. 10, 2024

(54) TAPE REEL AND TAPE CARTRIDGE

(71) Applicant: FUJIFILM CORPORATION, Tokyo (JP)

(72) Inventor: Yosuke Sumiya, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 93 days.

(21) Appl. No.: 18/160,310

(22) Filed: Jan. 27, 2023

(65) Prior Publication Data
US 2023/0282238 A1    Sep. 7, 2023

(30) Foreign Application Priority Data

Mar. 2, 2022  (JP) .................... 2022-032119

(51) Int. Cl.
*G11B 23/107* (2006.01)
*B65H 75/14* (2006.01)

(52) U.S. Cl.
CPC .......... *G11B 23/107* (2013.01); *B65H 75/14* (2013.01)

(58) Field of Classification Search
CPC . G11B 23/044; G03B 2217/261; G03B 23/02
See application file for complete search history.

(56) References Cited

U.S. PATENT DOCUMENTS

| | | | | |
|---|---|---|---|---|
| 2006/0086858 A1* | 4/2006 | Inugai | ................. | G11B 23/107 242/348 |
| 2009/0224091 A1* | 9/2009 | Ishikawa | ............. | G11B 23/107 242/348 |
| 2011/0186674 A1* | 8/2011 | Hiraguchi | ............ | G11B 23/037 242/348 |
| 2011/0192929 A1* | 8/2011 | Hiraguchi | ............ | G11B 23/044 242/348 |
| 2015/0353320 A1* | 12/2015 | Mori | .................... | G11B 23/037 242/614 |
| 2016/0279848 A1* | 9/2016 | Sumiya | ............... | B29C 45/0025 |
| 2016/0284378 A1* | 9/2016 | Sumiya | ................. | B65H 75/14 |
| 2023/0317113 A1* | 10/2023 | Sumiya | ............... | G11B 23/107 360/132 |

FOREIGN PATENT DOCUMENTS

| | | |
|---|---|---|
| JP | 2010-044845 A | 2/2010 |
| JP | 2016-015191 A | 1/2016 |

* cited by examiner

*Primary Examiner* — William A. Rivera
(74) *Attorney, Agent, or Firm* — SOLARIS Intellectual Property Group, PLLC

(57) ABSTRACT

The tape reel includes the cylindrical portion and a bottom portion having an installation surface on which the cylindrical portion is installed upright. The installation surface has a central surface located on a center side of the bottom portion, and a first inclined surface formed on an outer peripheral portion of the central surface along a peripheral direction of the cylindrical portion and inclined such that a wall thickness of the bottom portion gradually decreases toward an outer peripheral side. A through hole penetrating the bottom portion is formed in the outer peripheral portion, a pair of wall portions are installed upright on the first inclined surface on both sides of the through hole in the peripheral direction, and a second inclined surface having an inclination angle smaller than an inclination angle of the first inclined surface with respect to the central surface is formed on a surface of each of the wall portions, which is connected to the central surface.

5 Claims, 10 Drawing Sheets

TAPE REEL AND TAPE CARTRIDGE

CROSS-REFERENCE TO RELATED APPLICATIONS

This application claims priority under 35 USC 119 from Japanese Patent Application No. 2022-032119 filed on Mar. 2, 2022, the disclosure of which is incorporated by reference herein.

BACKGROUND OF THE INVENTION

1. Technical Field

The technology of the present disclosure relates to a tape reel and a tape cartridge.

2. Related Art

JP2016-15191A discloses a reel including a bottomed cylindrical hub which is molded from a resin material and of which an upper end part side is open, a lower flange provided on a lower end part side of the hub and molded integrally with the hub, an annular upper flange facing the lower flange, and a welded portion in which a lower surface of the upper flange and an upper end surface of the hub are bonded to each other.

JP2010-44845A discloses a tape reel comprising a hub including a bottom portion and a cylindrical portion protruding from the bottom portion, in which a gear along a peripheral direction of the cylindrical portion is formed on the bottom portion, a first hole is formed inside the cylindrical portion, and a second hole is formed between the gear and an inner wall surface of the cylindrical portion in the bottom portion.

SUMMARY

An embodiment according to the technology of the present disclosure provides a tape reel of which a cylindrical portion has a shape with improved roundness and a tape cartridge provided with a tape reel of which a cylindrical portion has a shape with improved roundness.

According to a first aspect of the technology of the present disclosure, there is provided a tape reel comprising: a cylindrical portion; and a bottom portion having an installation surface on which the cylindrical portion is installed upright, in which the installation surface has a central surface located on a center side of the bottom portion, and a first inclined surface formed on an outer peripheral portion of the central surface along a peripheral direction of the cylindrical portion and inclined such that a wall thickness of the bottom portion gradually decreases toward an outer peripheral side, a through hole penetrating the bottom portion is formed in the outer peripheral portion, a pair of wall portions are installed upright on the first inclined surface on both sides of the through hole in the peripheral direction, and a second inclined surface having an inclination angle smaller than an inclination angle of the first inclined surface with respect to the central surface is formed on a surface of each of the wall portions, which is connected to the central surface.

According to a second aspect of the technology of the present disclosure, in the tape reel according to the first aspect, an angle ratio of the inclination angle of the second inclined surface to the inclination angle of the first inclined surface is 0.03 or more and 0.50 or less.

According to a third aspect of the technology of the present disclosure, in the tape reel according to the first or second aspect, a tapered surface formed on an opening edge of the through hole on a second inclined surface side and having a shape that expands toward the second inclined surface side is further provided.

According to a fourth aspect of the technology of the present disclosure, in the tape reel according to any one of the first to third aspects, a plurality of the through holes are formed at an interval in the peripheral direction, and the wall portions are installed upright on both sides of the through hole in the peripheral direction, respectively.

According to a fifth aspect of the technology of the present disclosure, there is provided a tape cartridge comprising: the tape reel according to any one of the first to fourth aspects; and a case that rotatably supports the tape reel and accommodates the tape reel and a tape wound around the tape reel.

BRIEF DESCRIPTION OF THE DRAWINGS

Exemplary embodiments of the technology of the disclosure will be described in detail based on the following figures, wherein.

DETAILED DESCRIPTION

An example of embodiments according to the technology of the present disclosure will be described with reference to the accompanying drawings.

Figure 1:
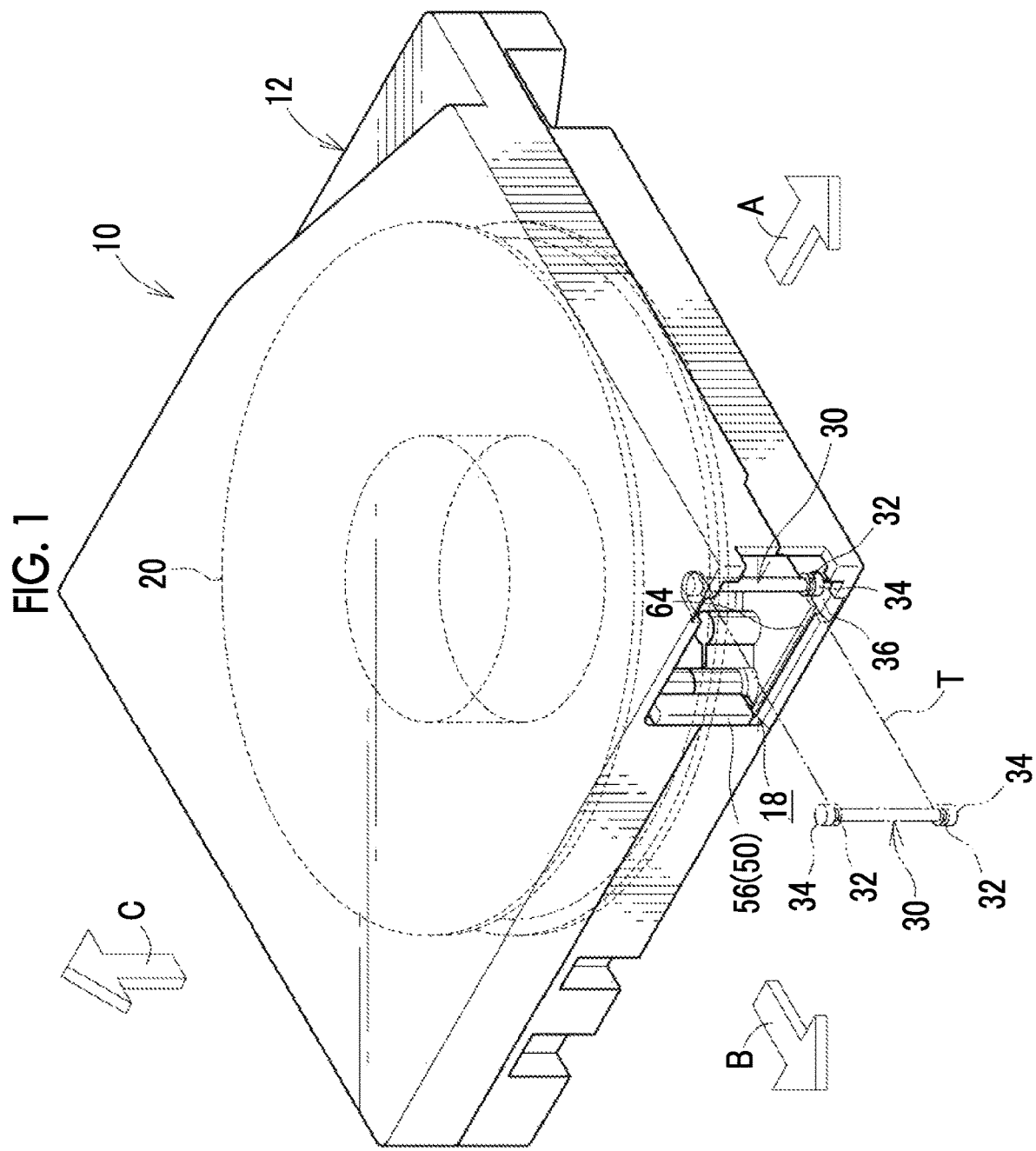
FIG. 1 is a perspective view showing a tape cartridge provided with a tape reel according to a first embodiment.

As shown in FIG. 1, a tape cartridge 10 has a case 12. One tape reel 20 is accommodated in the case 12. A recording tape T is wound around the tape reel 20. Details of the case 12 and the tape reel 20 will be described later. The case 12 is an example of a "case" according to the technology of the present disclosure. The tape reel 20 is an example of a "tape reel" according to the technology of the present disclosure. The tape cartridge 10 is an example of a "tape cartridge" according to the technology of the present disclosure.

The tape cartridge 10 is inserted into a drive device (not shown). In the drive device, the recording tape T is unwound from the tape cartridge 10, and information is written onto and read out from the recording tape T.

In the drawings, an arrow A indicates a loading direction of the tape cartridge 10 into the drive device. A direction indicated by the arrow A is a front direction of the tape cartridge 10. A direction indicated by an arrow B perpendicular to the arrow A is set as a right direction of the tape cartridge 10, and a direction indicated by an arrow C perpendicular to the arrow A and the arrow B is set as an upper direction of the tape cartridge 10 and the tape reel 20. In addition, in the following, a radial direction and a peripheral direction of the tape reel 20 may be simply referred to as a "radial direction" and a "peripheral direction". The above-described front direction, right direction, and upper direction are directions defined for convenience and do not limit a direction of the tape cartridge according to the technology of the present disclosure.

Figure 2:
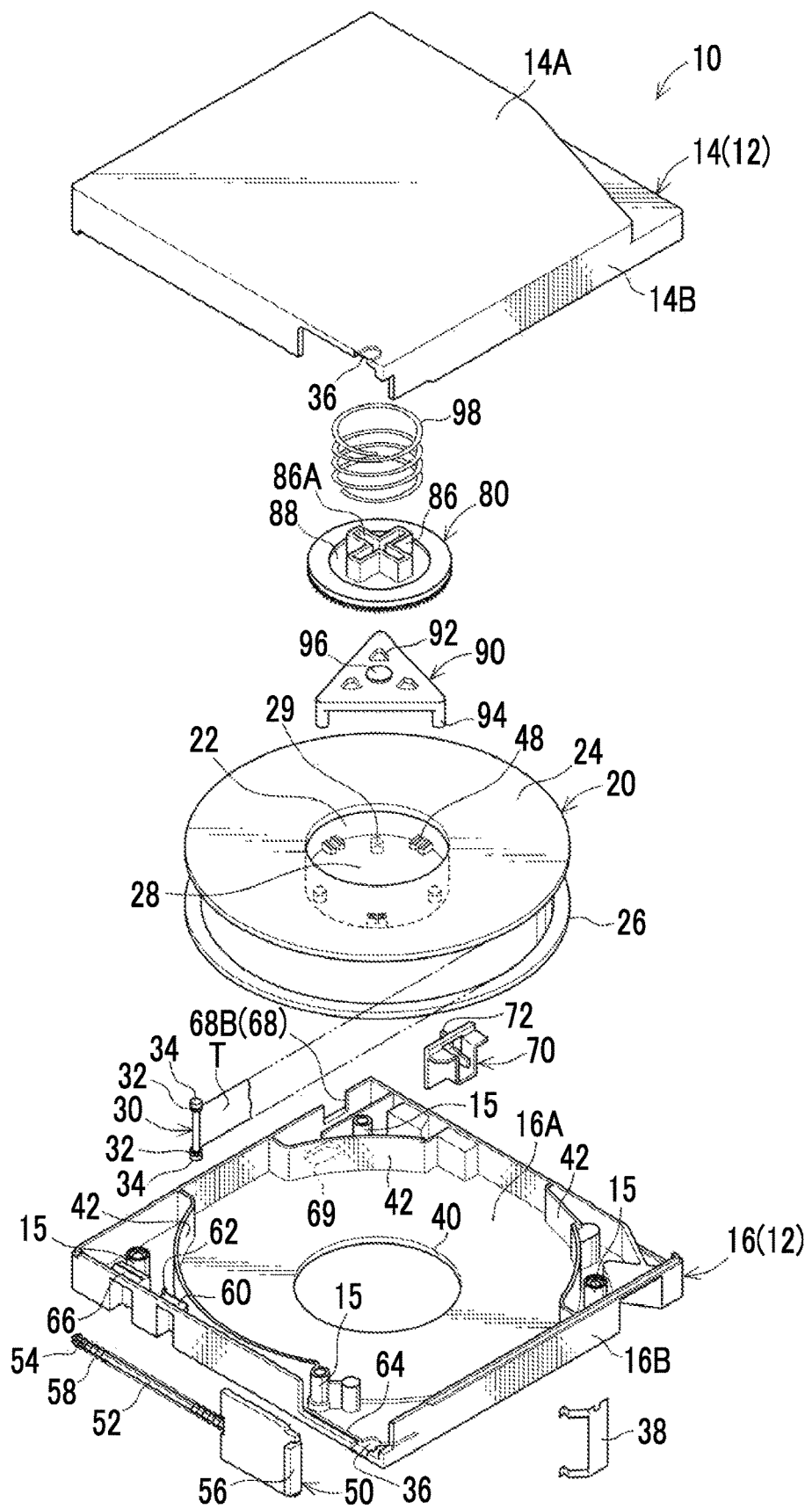
FIG. 2 is an exploded perspective view showing the tape cartridge provided with the tape reel according to the first embodiment as viewed from above.
Figure 3:
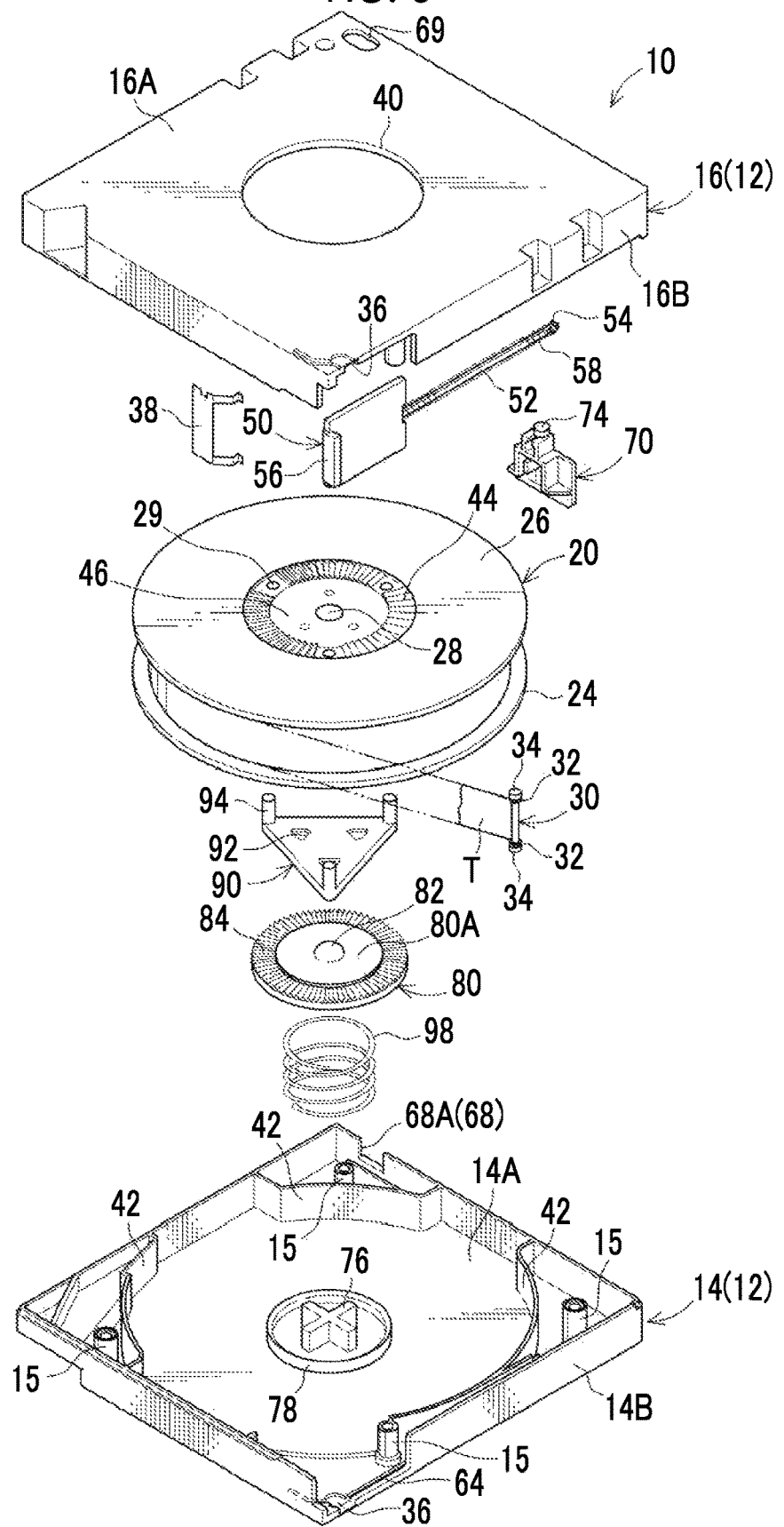
FIG. 3 is an exploded perspective view showing the tape cartridge provided with the tape reel according to the first embodiment as viewed from below.

As shown in FIGS. 1 to 3, the case 12 is formed in a rectangular flat box shape. The case 12 has an upper case 14 and a lower case 16. A peripheral wall 14B is installed upright on a peripheral edge of a top plate 14A of the upper case 14, and a peripheral wall 16B is installed upright on a peripheral edge of a bottom plate 16A of the lower case 16. The upper case 14 and the lower case 16 are joined to each other by, for example, ultrasonic welding and/or screwing in a state in which a lower end of the peripheral wall 14B and an upper end of the peripheral wall 16B are in contact with each other. The upper case 14 and the lower case 16 are made of a resin, such as polycarbonate (PC), as an example.

In the examples shown in FIGS. 2 and 3, screw bosses 15 are formed in the vicinity of a plurality of corner portions of each of the upper case 14 and the lower case 16, respectively. The upper case 14 and the lower case 16 are joined to each other by screwing a screw (not shown) into each screw boss 15 from a lower surface side of the lower case 16, whereby the case 12 is assembled. One tape reel 20 made of a resin is rotatably accommodated inside the case 12.

The tape reel 20 has a hub 22, an upper flange 24, and a lower flange 26. The hub 22 is an example of a "cylindrical portion" according to the technology of the present disclosure. The hub 22 is molded into a bottomed cylindrical shape of which an upper end part side is open. The upper flange 24 is formed in an annular shape, and the lower flange 26 is also formed in an annular shape. The upper flange 24 and the lower flange 26 face each other.

In the present embodiment, the upper flange 24 is ultrasonically welded to the upper end part side of the hub 22. On the other hand, the lower flange 26 is molded on a lower end part side of the hub 22 integrally with the hub 22. That is, a hub member with a lower flange 100 is composed of the hub 22 and the lower flange 26.

The recording tape T is wound around an outer peripheral surface of the hub 22. The recording tape T is an example of a magnetic tape or the like as an information recording/reproducing medium. Positions of both end parts in a width direction of the wound recording tape T are restricted by the upper flange 24 and the lower flange 26 that face each other in parallel.

The hub 22 has a bottom wall 28 formed on one end side in an axial direction of the hub 22, specifically, on a proximal end side. The bottom wall 28 is an example of a "bottom portion" according to the technology of the present disclosure. The bottom wall 28 is perpendicular to the hub 22. The hub 22 is installed upright from an upper surface 33 of the bottom wall 28. The upper surface 33 is an example of an "installation surface" according to the technology of the present disclosure. For convenience, a direction in which the hub 22 is installed upright from the bottom wall 28 is set as the upper direction in the tape reel 20 according to the technology of the present disclosure. In addition, for convenience, a direction opposite to the direction in which the hub 22 is installed upright from the bottom wall 28 is set as a lower direction in the tape reel 20 according to the technology of the present disclosure. For example, an "upper side of the tape reel 20" is a side on which the hub 22 is installed upright in the tape reel 20, and a "lower side of the tape reel 20" is a side opposite to the side on which the hub 22 is installed upright in the tape reel 20. The above-described front direction, right direction, and upper direction are also directions defined for convenience, and do not limit the direction of the tape cartridge according to the technology of the present disclosure. A reel gear 44 is formed in an annular shape on a lower surface (outer surface) of the bottom wall 28.

A gear opening portion 40 for exposing the reel gear 44 to the outside of the case 12 is formed in a central part of the lower case 16. The reel gear 44 exposed from the gear opening portion 40 meshes with a drive gear (not shown) formed on a rotary shaft (not shown) of the drive device. Then, the reel gear 44 is rotationally driven by the drive gear, whereby the tape reel 20 rotates relative to the case 12 in the case 12.

A reel plate 46 is stuck radially inward of the reel gear 44 in the lower surface of the bottom wall 28. The reel plate 46 is a disc-shaped metal plate formed of a magnetic material. The reel plate 46 is stuck coaxially and integrally with the hub 22 by, for example, insert molding. The reel plate 46 is adsorbed/held by a magnetic force of an annular magnet (not shown) provided in the rotary shaft of the drive device.

A plurality of floating restriction walls 42 are partially provided on an inner surface of each of the upper case 14 and the lower case 16. Each floating restriction wall 42 is formed in an arc shape concentric with the gear opening portion 40. The tape reel 20 is held so as not to rattle in the radial direction by being surrounded by the plurality of floating restriction walls 42.

An opening 18 is formed in a right wall of the case 12. The recording tape T wound around the tape reel 20 can be pulled out through the opening 18.

A leader pin 30 is stuck to a free end part of the recording tape T pulled out from the opening 18. The leader pin 30 is locked by a pull-out member (not shown) of the drive device and is operated to be pulled out. Both end parts of the leader pin 30 protrude with respect to the end parts in the width direction of the recording tape T. An annular groove 32 is formed in each of both end parts of the leader pin 30. The annular groove 32 is locked to a hook or the like of the pull-out member of the drive device.

A pair of pin holding portions 36 are provided inside the opening 18 of the case 12. In the example shown in FIG. 2, respective pin holding portions 36 are provided so as to face an inner surface of the top plate 14A of the upper case 14 and an inner surface of the bottom plate 16A of the lower case 16. The pin holding portions 36 position and hold the leader pin 30 in the case 12. The pin holding portion 36 has a substantially semi-circular shape in which a side from which the recording tape T is pulled out is open. Each of both end parts 34 of the leader pin 30 can enter and exit the pin holding portion 36 from an open side of the pin holding portion 36.

A leaf spring 38 is fixed in the case 12. The leaf spring 38 is disposed on an inner side of the case 12 with respect to the pin holding portion 36. The leaf spring 38 has bifurcated tip parts. The tip parts of the leaf spring 38 are engaged with both end parts 34 on the upper and lower sides of the leader pin 30, respectively, whereby the leader pin 30 is held by the pin holding portions 36. In a case where the leader pin 30 enters and exits the pin holding portions 36, each tip part of the leaf spring 38 is appropriately elastically deformed to allow the leader pin 30 to move.

A door 50 is provided in the case 12. The door 50 is formed in a rectangular plate shape having a size capable of closing the opening 18. Groove portions 64 are formed in the top plate 14A and the bottom plate 16A inside the opening 18. Upper and lower end parts of the door 50 are slidably fitted into the groove portions 64, respectively. With this, the door 50 moves along the right wall of the case 12 and opens and closes the opening 18.

A shaft 52 is provided at a rear end of the door 50 in a protruding manner. A coil spring 58 is inserted onto the shaft 52. A spreading portion 54 is formed at the rear end of the shaft 52. The coil spring 58 is prevented from falling off from the shaft 52 by the spreading portion 54. A support mount 60 having a locking portion 62 is provided in the lower case 16 in a protruding manner. A rear end of the coil spring 58 inserted onto the shaft 52 is locked to the locking portion 62.

The shaft 52 is slidably supported on the support mount 60, and the rear end of the coil spring 58 is locked to the locking portion 62. With this, the door 50 is always biased in a closing direction of the opening 18 by a biasing force of the coil spring 58.

A projecting portion 56 is provided at a front end of the door 50 so as to protrude outward. With the insertion and loading of the tape cartridge 10 into the drive device, the projecting portion 56 is engaged with an opening and closing member (not shown) provided on the drive device side. The opening and closing member provided on the drive device side applies a force to an opening side of the door 50 with respect to the projecting portion 56, whereby the door 50 is opened against the biasing force of the coil spring 58.

A write protect 70 is provided in a left rear portion of the case 12. The write protect 70 is slidable in a left-right direction.

The write protect 70 is a member that sets "possible" or "impossible" of recording on the recording tape T. An operation protrusion 72 for manually sliding the write protect 70 in the left-right direction is formed on the write protect 70.

An open hole 68 is formed in a rear wall of the case 12. The operation protrusion 72 protrudes from the open hole 68 to the outside of the case 12. In the examples shown in FIGS. 2 and 3, a notched portion 68A is formed in the peripheral wall 14B of the upper case 14, and a notched portion 68B is formed in the peripheral wall 16B of the lower case 16. The open hole 68 is formed by the notched portion 68A and the notched portion 68B in a state in which the upper case 14 and the lower case 16 are joined to each other.

A protruding portion 74 is formed on the write protect 70. An elongated hole 69 is formed in the lower case 16. A longitudinal direction of the elongated hole 69 matches the left-right direction of the case 12. The protruding portion 74 is exposed to the outside of the case 12 from the elongated hole 69. In a state in which the tape cartridge 10 is loaded in the drive device, the position of the protruding portion 74 is detected on the drive device side, and "possible" or "impossible" of recording on the recording tape T is determined.

Figure 6:
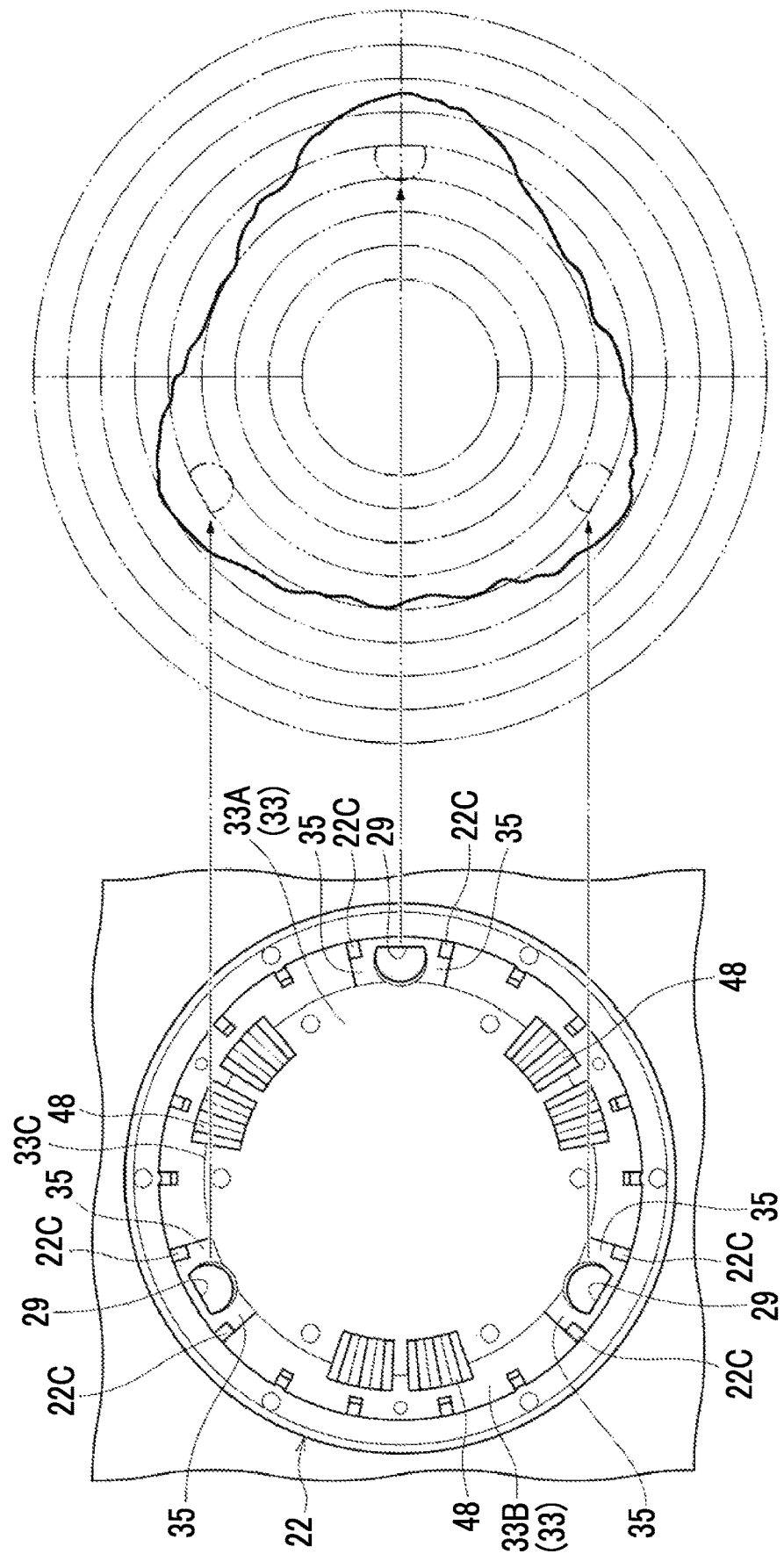
FIG. 6 is a plan view showing the tape reel according to the first embodiment partially enlarged and showing a graph of roundness of a hub.

A plurality of engaging gears 48 are provided on a peripheral edge of the upper surface of the bottom wall 28 of the hub 22. The plurality of engaging gears 48 are provided in the peripheral direction of the hub 22 with a gap therebetween (for example, at an equal interval). A plurality of through holes 29 are formed at positions on the reel gear 44 and between the plurality of engaging gears 48. In the example shown in FIG. 2, the number of the plurality of engaging gears 48 is three. The three engaging gears 48 are arranged at intervals of 120 degrees in the peripheral direction of the hub 22. The number of the plurality of through holes 29 is also three. As shown in FIG. 6, the three through holes 29 are also arranged at intervals of 120 degrees in the peripheral direction of the hub 22. The through hole 29 is an example of a "through hole" according to the technology of the present disclosure. FIG. 6 shows a plan view of the hub 22 as viewed from above and a graph showing the roundness of the hub 22. In the graph of FIG. 6, deviation from a perfect circle is emphasized in a shape in which the hub 22 is viewed in a plan view.

A braking member 80 is disposed inside the hub 22. The braking member 80 is a disc-shaped member molded from a resin material as an example. A cylindrical cavity of the hub 22 is a space capable of accommodating a braking mechanism including the braking member 80. Further, a hole portion 25A of the upper flange 24 is a hole through which the braking mechanism can pass and operate.

An annular braking gear 84 is formed on a peripheral edge of a lower surface 80A of the braking member 80. The braking gear 84 can mesh with the engaging gears 48.

A rotation restricting rib 76 is provided so as to protrude downward from the inner surface of the top plate 14A of the upper case 14. The rotation restricting rib 76 has a cross shape in a plan view. An engaging protrusion 86 having a cross shape in a plan view is provided on an upper surface of the braking member 80 in a protruding manner. A height of the engaging protrusion 86 is higher than a height of the rotation restricting rib 76. In a state in which the rotation restricting rib 76 is inserted into the engaging protrusion 86, the braking member 80 is non-rotatable with respect to the case 12 (specifically, the upper case 14) and is movable in an up-down direction in the hub 22.

A compression coil spring 98 is disposed between the upper case 14 and the braking member 80. The braking member 80 is biased downward by a biasing force of the compression coil spring 98. As shown in FIG. 3, an annular protrusion 78 is provided outside the rotation restricting rib 76 of the upper case 14 in a protruding manner. One end of the compression coil spring 98 is located inside the annular protrusion 78 (specifically, between the rotation restricting rib 76 and the annular protrusion 78). Further, as shown in FIG. 2, an annular groove 88 is provided in the upper surface of the braking member 80. The other end of the compression coil spring 98 is located in the annular groove 88.

The braking gear 84 meshes with the engaging gears 48 in a state in which the tape cartridge 10 is not used (that is, a state in which the tape cartridge 10 is not loaded in the drive device). The braking gear 84 meshes with the engaging gears 48, thereby preventing the tape reel 20 from rotating relative to the case 12. Then, the tape reel 20 is pushed toward the lower case 16 side by the biasing force of the compression coil spring 98, and the reel gear 44 is exposed from the gear opening portion 40.

A release member 90 is disposed inside the hub 22. The release member 90 is located below the braking member 80 (specifically, between the bottom wall 28 and the braking member 80). The release member 90 is a member molded from a resin material and having a regular triangular shape in a plan view. A plurality of through holes 92 are formed in the release member 90 so that a weight of the release member 90 can be reduced.

A plurality of leg portions 94 are provided on a lower surface of the release member 90 in a protruding manner. In the examples shown in FIGS. 2 and 3, the leg portion 94 is provided at each apex portion of the release member 90. The leg portion 94 is inserted into the through hole 29 and protrudes onto the reel gear 44 from the lower surface of the bottom wall 28.

As shown in FIG. 2, a support projecting portion 96 is formed at the center of an upper surface of the release member 90. As shown in FIG. 3, a hemispherical release protrusion 82 is provided at the center of the lower surface 80A of the braking member 80 in a protruding manner. The release protrusion 82 is in contact with the support projecting portion 96. With this, a contact area between the braking member 80 and the release member 90 is reduced, and a sliding resistance in a use state (that is, a state in which the tape reel 20 rotates) is reduced. For example, polyacetal (POM) can be used as a material of the braking member 80. For example, polybutylene terephthalate (PBT) can be used as a material of the release member 90.

Figure 4:
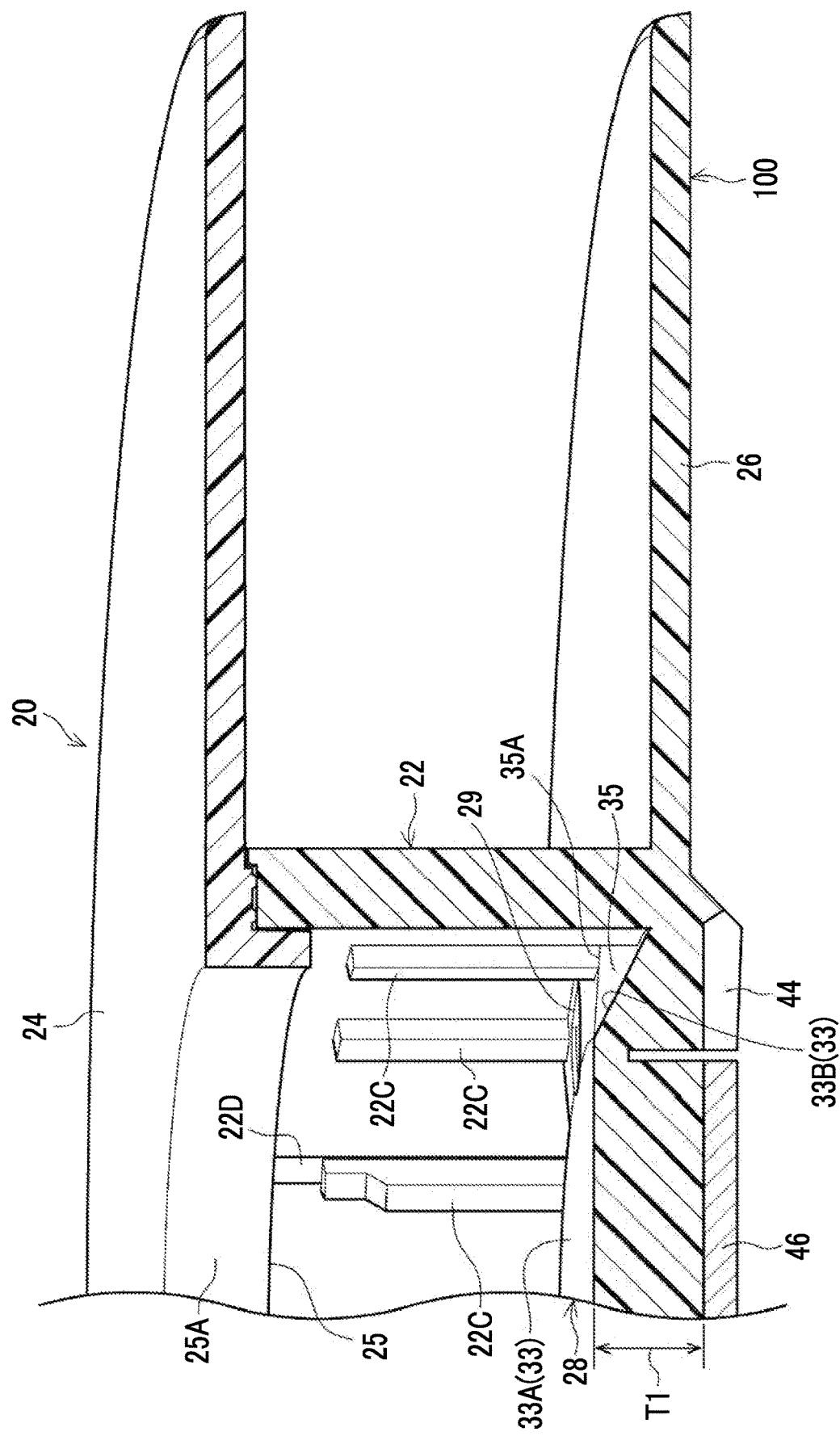
FIG. 4 is a perspective view showing a partially enlarged cross section of the tape reel according to the first embodiment.

As shown in FIG. 4, a short cylindrical portion 25 is installed upright on an inner peripheral portion side (specifically, on an inner peripheral edge portion) of the upper flange 24. The short cylindrical portion 25 is inserted inside the hub 22 along an inner peripheral surface of the hub 22.

Figure 5:
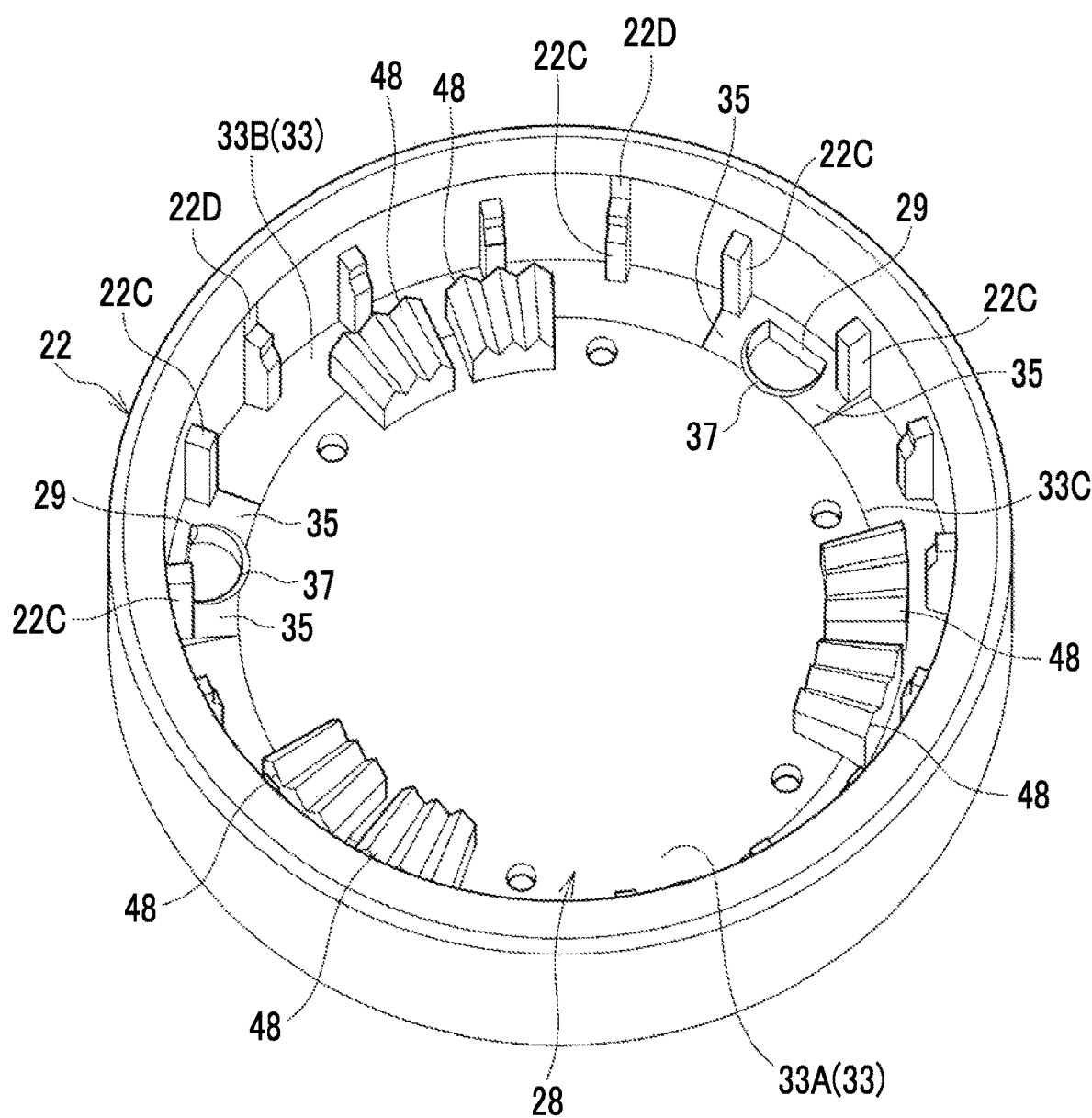
FIG. 5 is a partially enlarged perspective view of the tape reel according to the first embodiment.

As shown in FIG. 5, a plurality of restricting ribs 22C extending in the up-down direction are formed on the inner peripheral surface of the hub 22. The plurality of restricting ribs 22C are formed at equal intervals in the peripheral direction. In a case where the braking member 80 moves in the hub 22 in the up-down direction, a radial position of the braking member 80 is restricted from an outer side. Further, a plurality of projecting portions 22D are formed on the inner peripheral surface of the hub 22. Each of the projecting portions 22D extends in the up-down direction separately from each of the restricting ribs 22C. The number of the plurality of projecting portions 22D is, for example, six. The plurality of projecting portions 22D are formed at equal intervals in the peripheral direction.

Figure 7:
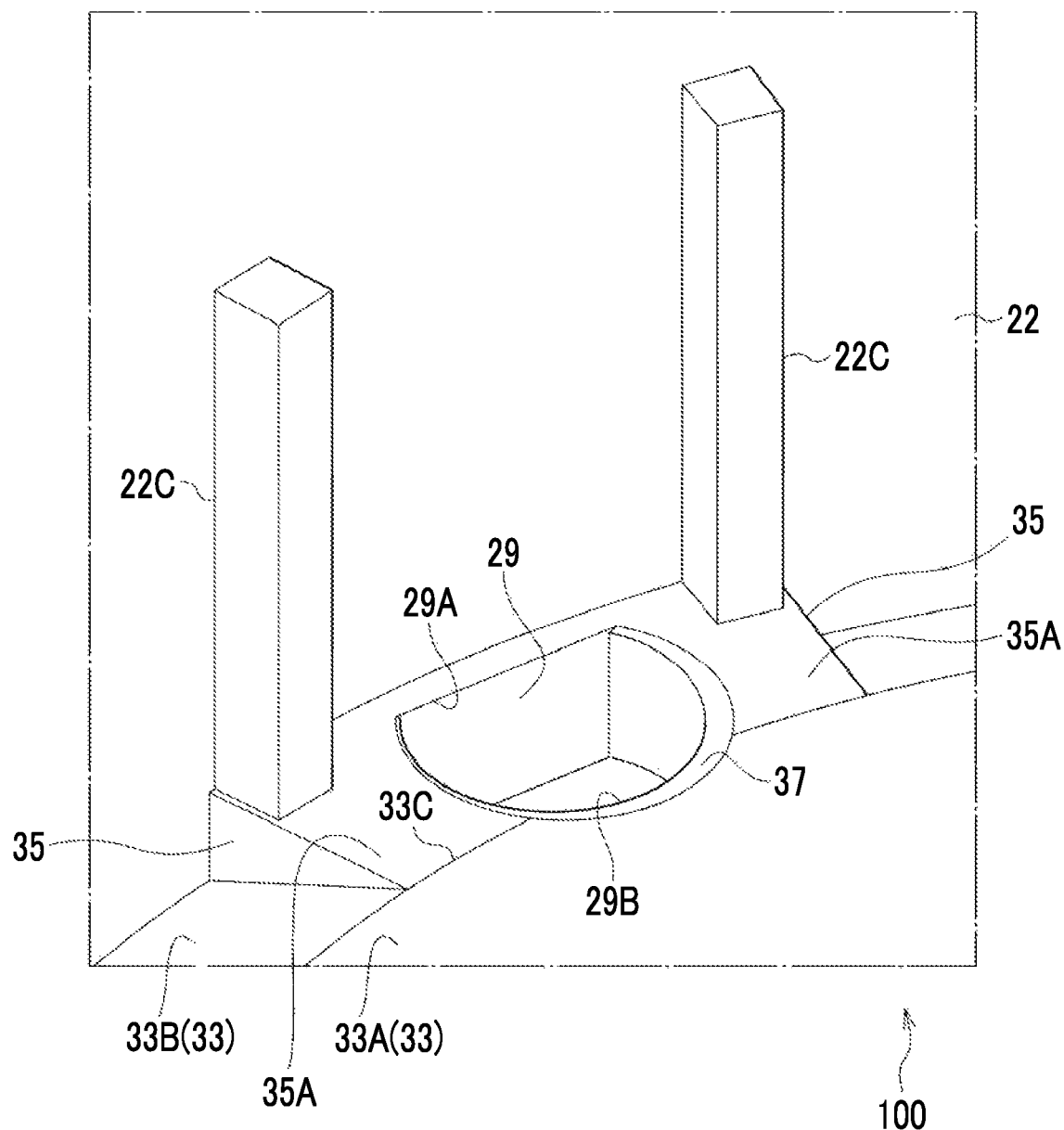
FIG. 7 is a partially enlarged perspective view of the tape reel according to the first embodiment.

As shown in FIGS. 5 to 7, the upper surface 33 of the bottom wall 28 has a central surface 33A and a first inclined surface 33B. The central surface 33A is an example of a "central surface" according to the technology of the present disclosure. The first inclined surface 33B is an example of a "first inclined surface" according to the technology of the present disclosure.

Figure 10:
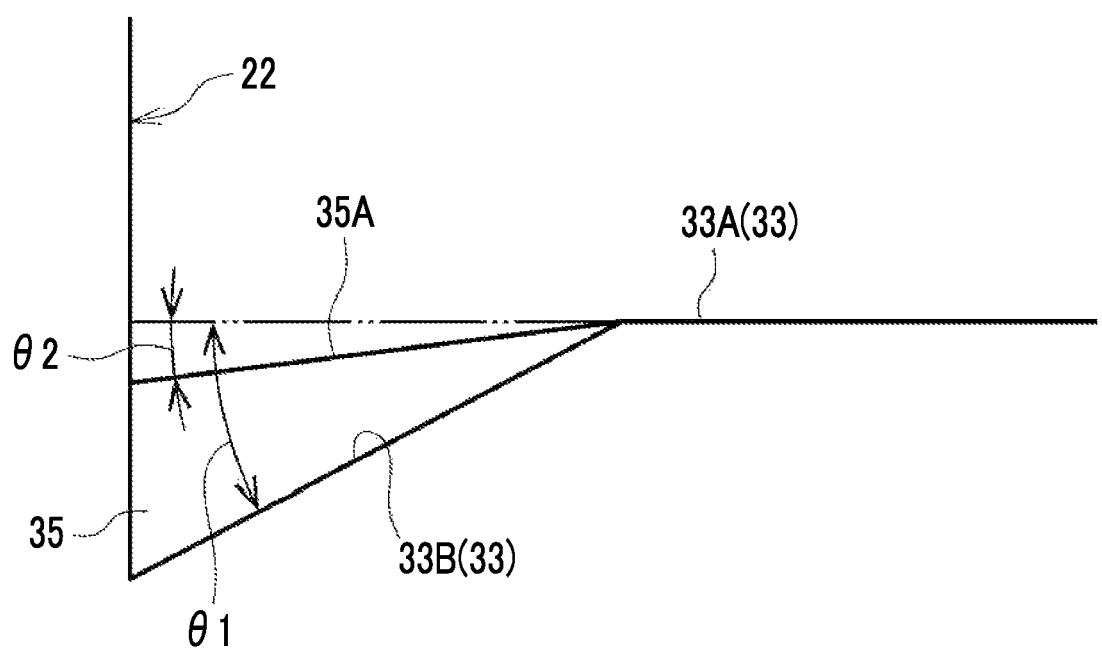
FIG. 10 is a diagram illustrating an inclination angle of a first inclined surface and a second inclined surface in the tape reel.

The central surface 33A is located on a center side of the bottom wall 28. On the other hand, the first inclined surface 33B is located on a radially outer side of the bottom wall 28, that is, on the outer peripheral side. The first inclined surface 33B is connected to the central surface 33A through an outer peripheral portion 33C of the central surface 33A and is formed along the peripheral direction. The first inclined surface 33B is inclined with respect to the central surface 33A. Specifically, the first inclined surface 33B is inclined downward (on a side opposite to a side on which the hub 22 is installed upright) while facing the radially outer side, that is, the outer peripheral side. As shown in FIG. 10, an inclination angle of the first inclined surface 33B with respect to the central surface 33A is hereinafter referred to as an inclination angle $\theta 1$. Since the first inclined surface 33B is formed, a wall thickness T1 (see FIG. 4) of the bottom wall 28 gradually decreases toward the outer peripheral side.

The plurality of through holes 29 are each formed so as to penetrate the bottom wall 28, in the outer peripheral portion 33C.

A pair of wall portions 35 are installed upright on both sides of each through hole 29 in the peripheral direction, respectively. Each wall portion 35 is installed upright on the first inclined surface 33B. The wall portion 35 is connected to the hub 22 on the outer peripheral side. The wall portion 35 is an example of a "wall portion" according to the technology of the present disclosure.

The wall portion 35 prevents foreign matter from passing through the through hole 29 and entering the inside of the hub 22 in a state in which the leg portion 94 of the release member 90 is not inserted into the through hole 29.

An upper surface of the wall portion 35 is a second inclined surface 35A. The second inclined surface 35A is an example of a "second inclined surface" according to the technology of the present disclosure. The second inclined surface 35A is connected to the central surface 33A and is inclined with respect to the central surface 33A. Specifically, the second inclined surface 35A is inclined downward (on the side opposite to the side on which the hub 22 is installed upright) while facing the radially outer side, that is, the outer peripheral side. As shown in FIG. 10, an inclination angle of the second inclined surface 35A with respect to the central surface 33A is hereinafter referred to as an inclination angle $\theta 2$. The inclination angle $\theta 2$ of the second inclined surface 35A is smaller than the inclination angle $\theta 1$ of the first inclined surface 33B.

A tapered surface 37 is formed in each through hole 29. The tapered surface 37 is an example of a "tapered surface" according to the technology of the present disclosure. The tapered surface 37 is formed on an opening edge of the through hole 29 on the second inclined surface 35A side, that is, on an upper opening edge of the through hole 29. The tapered surface 37 is formed on a remaining edge portion 29B of the through hole 29 excluding an edge portion 29A provided on the hub 22 side, and forms a C-shape when viewed from the upper side (the side on which the hub 22 is installed upright). The tapered surface 37 has a shape that expands from a center side of the through hole 29 toward the second inclined surface 35A side (that is, radially outward of the through hole 29). In other words, the tapered surface 37 is a surface formed in an orientation in which the leg portion 94 is guided to the center side of the through hole 29 with the insertion of the leg portion 94 into the through hole 29, in a case where each leg portion 94 of the release member 90 inserted into the through hole 29 from the second inclined surface 35A side comes into contact with the tapered surface 37.

Next, the action of the present embodiment will be described.

The hub member with a lower flange 100 according to the present embodiment is formed (produced) by performing injection molding of a resin using a mold. In the injection molding, the resin is injected into a cavity of the mold, and the injected resin contracts with solidification through cooling.

In the hub member with a lower flange 100, the first inclined surface 33B that is inclined at the inclination angle $\theta 1$ with respect to the central surface 33A is formed. The wall portion 35 is installed upright on the first inclined surface 33B. The second inclined surface 35A that is inclined at the inclination angle $\theta 2$ with respect to the central surface 33A is formed on the wall portion 35.

Figure 8:
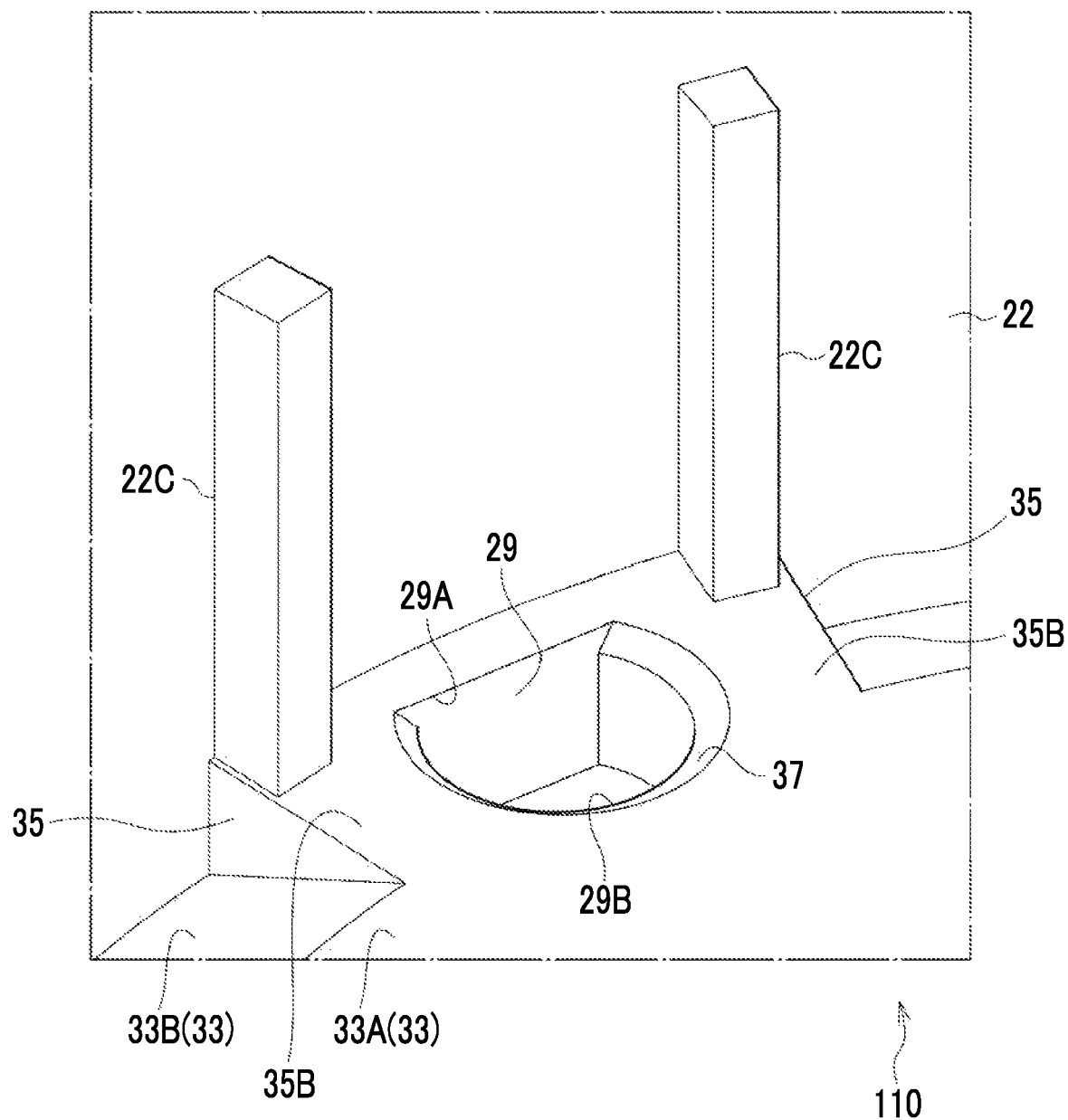
FIG. 8 is a partially enlarged perspective view of a tape reel according to a first comparative example.
Figure 9:
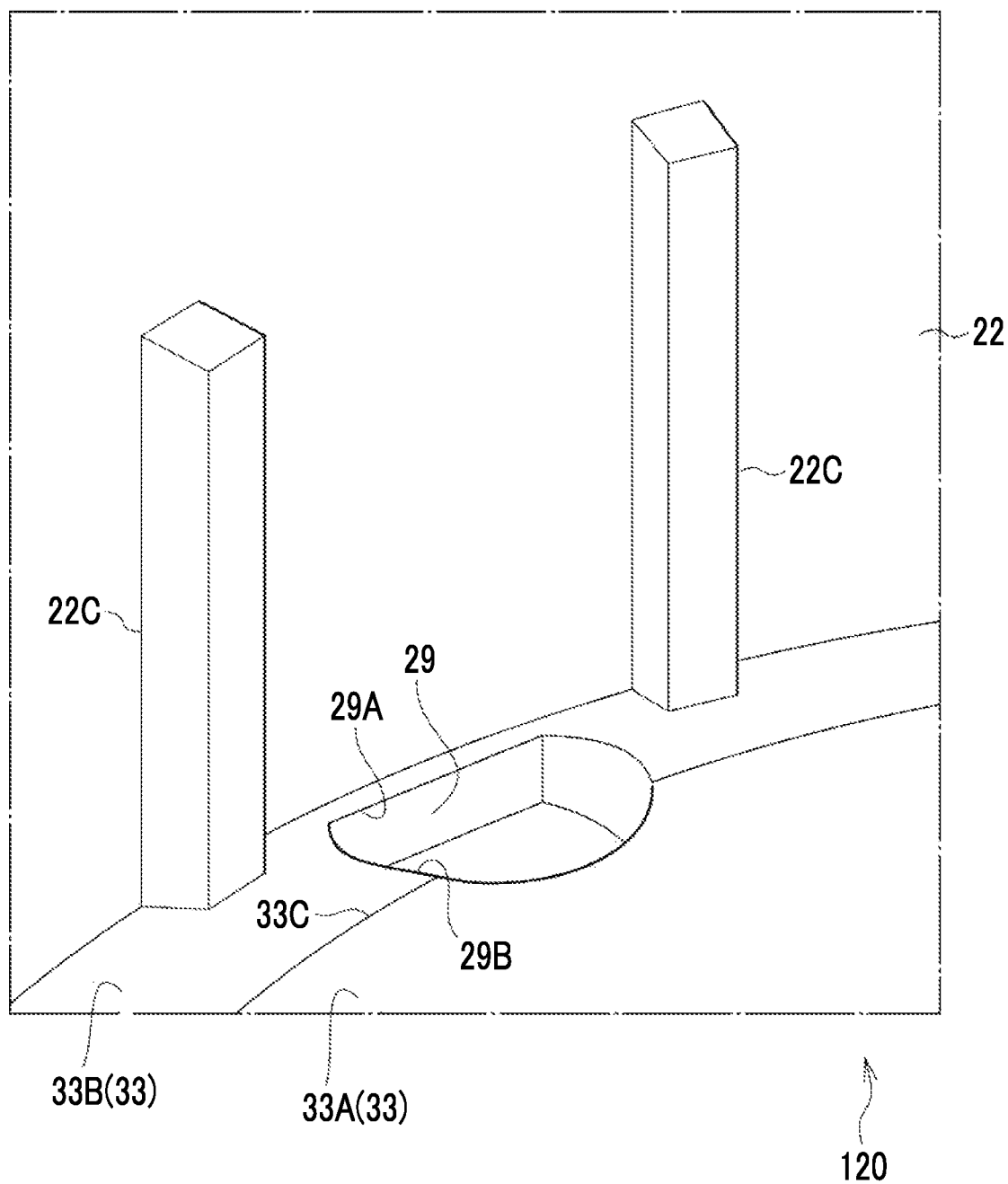
FIG. 9 is a partially enlarged perspective view of a tape reel according to a second comparative example.

Here, FIG. 8 shows a hub member with a lower flange 110 of a first comparative example in a partially enlarged manner. Further, FIG. 9 shows a hub member with a lower flange 120 of a second comparative example in a partially enlarged manner. In the first comparative example and the second comparative example, the same elements, members, and the like as those in the first embodiment are designated by the same reference numerals as those in the first embodiment.

In the hub member with a lower flange 110 of the first comparative example shown in FIG. 8, an upper surface 35B of the wall portion 35 forms the same plane as the central surface 33A. That is, the upper surface 35B is not inclined with respect to the central surface 33A of the bottom wall 28. The wall portion 35 is connected to the hub 22 on the outer peripheral side. In the first comparative example, since the upper surface 35B is not inclined with respect to the central surface 33A, an area connected to the hub 22 is wider than that of the present embodiment. Therefore, in the hub member with a lower flange 110 of the first comparative example, in a case where the resin contracts in the injection molding, the resistance of the wall portion 35 against the contraction of the hub 22 at a portion where the wall portion 35 is formed is greater than that of the present embodiment. For this reason, the hub 22 may have a shape in which the portion where the wall portion 35 is formed bulges radially outward as compared with a portion where the wall portion 35 is not formed.

In the hub member with a lower flange 120 of the second comparative example shown in FIG. 9, the wall portion 35 (see FIG. 7) is not formed on the first inclined surface 33B, and the first inclined surface 33B has a shape continuous to the edge portion 29B of the through hole 29. That is, in the hub member with a lower flange of the second comparative example, since there is no wall portion 35 that acts as the resistance against the contraction of the hub 22 in a case where the resin contracts in the injection molding, the hub 22 having a shape with improved roundness is formed as compared with the hub member with a lower flange 110 of the first comparative example in which the wall portion 35 is formed. However, since the wall portion 35 is not formed, foreign matter is more likely to pass through the through hole 29 and to enter the inside of the hub 22 as compared with a structure in which the wall portion 35 is formed.

On the other hand, in the hub member with a lower flange 100 of the present embodiment, since the wall portion 35 is formed, foreign matter can be prevented from passing through the through hole 29 and entering the inside of the hub 22, as compared with the hub member with a lower flange of the second comparative example in which the wall portion 35 is not formed.

Further, in the hub member with a lower flange 100 of the present embodiment, the second inclined surface 35A is formed on the wall portion 35. That is, in the hub member with a lower flange 100 of the present embodiment, an area of the wall portion 35 connected to the hub 22 is narrow as compared with the hub member with a lower flange 110 of the first comparative example in which the second inclined surface 35A is not formed on the wall portion 35. Therefore, in the hub member with a lower flange 100 of the present embodiment, the resistance of the wall portion 35 applied against the contraction of the hub 22 in a case where the resin contracts in the injection molding is small as compared with the hub member with a lower flange 110 of the first comparative example. Accordingly, in the hub member with a lower flange 100 of the first embodiment, as shown in FIG. 6, the tape reel 20 of which the hub 22 has a shape with improved roundness as compared with the hub member with a lower flange 110 of the first comparative example is obtained.

From the viewpoint of reducing the resistance of the wall portion 35 applied against the contraction of the hub 22 in a case where the resin contracts in the injection molding, as compared with the hub member with a lower flange 110 of the first comparative example in which the second inclined surface 35A is not formed on the wall portion 35, the inclination angle θ2 of the second inclined surface 35A need only be within a range larger than 0 degrees and smaller than the inclination angle θ1 of the first inclined surface 33B.

In the present embodiment, the ratio of the inclination angle θ2 of the second inclined surface 35A to the inclination angle θ1 of the first inclined surface 33B is 0.03 or more and 0.50 or less, as an example. The ratio of the inclination angle θ2 to the inclination angle θ1 is 0.50 or less, so that a height of the second inclined surface 35A from the first inclined surface 33B can be secured, and it is possible to highly exhibit the effect of preventing foreign matter from entering the inside of the hub 22, as compared with a case where the ratio is more than 0.50. In addition, the ratio of the inclination angle θ2 to the inclination angle θ1 is 0.03 or more, so that the portion where the wall portion 35 is formed is restrained from having a shape bulging radially outward in a case where the resin contracts in the injection molding, and the hub 22 having a shape with improved roundness can be obtained, as compared with a case where the ratio is less than 0.03.

In the present embodiment, the tapered surface 37 is formed on the opening edge of each through hole 29 on the second inclined surface 35A side. In a case where each leg portion 94 of the release member 90 inserted into the through hole 29 from the second inclined surface 35A side comes into contact with the tapered surface 37, the tapered surface 37 guides the leg portion 94 to the center side of the through hole 29.

In the present embodiment, since the plurality of through holes 29 are formed, it is possible to realize a structure in which the plurality of leg portions 94 of the release member 90 are each inserted into the through hole 29.

The wall portions 35 are installed upright on both sides of each through hole 29 in the peripheral direction. Therefore, it is possible to prevent foreign matter from passing through the through hole 29 and entering the inside of the hub 22 on both sides of each through hole 29 in the peripheral direction.

In the technology of the present disclosure, the tape reel 20 in which the roundness of the hub 22 is 30 μm or less can be obtained. This roundness is defined as $(D_{max}-D_{min})/2$, where a maximum value of a diameter of the hub 22 is denoted by $D_{max}$ and a minimum value is denoted by $D_{min}$. Further, the roundness of the hub 22 according to the technology of the present disclosure satisfies the above-described condition of roundness on both the proximal end side and the distal end side.

In the tape reel 20 according to the technology of the present disclosure, the recording tape T is wound around the hub 22. Then, in the drive device, the recording tape T is unwound from the tape cartridge 10. In this case, the roundness of the hub 22 is 30 μm or less, so that the transport speed of the recording tape T is restrained from fluctuating and it is possible to bring the transport speed closer to a constant speed, as compared with a case where the roundness is more than 30 μm. Since the transport speed of the recording tape T is restrained from fluctuating, errors in reading-out and writing-in of information with respect to the recording tape T can also be restrained from occurring.

In order to actually decide the shape of the mold for molding the hub member with a lower flange 100, the following method can be employed as an example.

That is, first, a hub member with a lower flange is formed using a mold for molding a hub member with a lower flange having a shape in which the second inclined surface 35A is not formed and the upper surface of the wall portion 35 forms the same plane as the central surface 33A (the upper surface is not inclined with respect to the central surface 33A of the bottom wall 28).

Then, the shape of the formed hub member with a lower flange is measured, and the shape of the mold is corrected from the measurement result. Specifically, the mold is corrected by setting the inclination angle θ2 of the second inclined surface 35A. Then, an operation of forming the hub member with a lower flange is performed again using the corrected mold. This operation is repeatedly performed to decide the inclination angle θ2 of the second inclined surface 35A, so that the shape of the hub of the formed hub member with a lower flange can be brought close to a perfect circle. Therefore, in the hub 22 according to the technology of the present disclosure, a lower limit value of the roundness is not defined.

A material of the hub member with a lower flange 100 according to the technology of the present disclosure is not particularly limited as long as the material is a resin. From the viewpoint of satisfying the strength and durability required for the tape reel 20, for example, glass fiber reinforced polycarbonate is preferable. A content of glass fiber in the glass fiber reinforced polycarbonate is, for example, 10% or more and 30% or less.

In the description of the present specification, "parallel" indicates parallel in a meaning including an error generally allowed in the technical field to which the technology of the present disclosure belongs, in addition to completely parallel. In the description of the present specification, "perpendicular" indicates perpendicular in a meaning including an error generally allowed in the technical field to which the technology of the present disclosure belongs, in addition to completely perpendicular. In the description of the present specification, the "equal interval" indicates an equal interval in a meaning including an error generally allowed in the technical field to which the technology of the present disclosure belongs, in addition to the perfect equal interval. In the description of the present specification, "match" indicates a match in a meaning including an error generally allowed in the technical field to which the technology of the present disclosure belongs, in addition to the perfect match.

The contents described and shown above are detailed descriptions of the parts according to the technology of the present disclosure, and are merely an example of the technology of the present disclosure. For example, the above description related to configurations, functions, actions, and advantageous effects is description related to an example of the configurations, functions, actions, and advantageous effects of the parts according to the technology of the present disclosure. Therefore, it goes without saying that unnecessary parts may be deleted, new elements may be added, or the replacements may be made for the contents described and shown above without departing from the gist of the technology of the present disclosure. Further, in order to avoid complications and facilitate understanding of the parts according to the technology of the present disclosure, descriptions of common general knowledge and the like that do not require special descriptions for enabling the implementation of the technology of the present disclosure are omitted, in the contents described and shown above.

In the present specification, "A and/or B" has the same meaning as "at least one of A or B". That is, "A and/or B" means that only A may be used, only B may be used, or a combination of A and B may be used. In addition, in the present specification, the same concept as "A and/or B" is also applied to a case where three or more matters are expressed by "and/or".

All documents, patent applications, and technical standards described in the present specification are incorporated in the present specification by reference to the same extent as in a case where the individual documents, patent applications, and technical standards were specifically and individually stated to be incorporated by reference.

What is claimed is:

1. A tape reel comprising:
   a cylindrical portion; and
   a bottom portion having an installation surface on which the cylindrical portion is installed upright,
   wherein the installation surface has
   a central surface located on a center side of the bottom portion, and
   a first inclined surface formed on an outer peripheral portion of the central surface along a peripheral direction of the cylindrical portion and inclined such that a wall thickness of the bottom portion gradually decreases toward an outer peripheral side,
   a through hole penetrating the bottom portion is formed in the outer peripheral portion,
   a pair of wall portions are installed upright on the first inclined surface on both sides of the through hole in the peripheral direction, and
   a second inclined surface having an inclination angle smaller than an inclination angle of the first inclined surface with respect to the central surface is formed on a surface of each of the wall portions, which is connected to the central surface.

2. The tape reel according to claim 1,
   wherein an angle ratio of the inclination angle of the second inclined surface to the inclination angle of the first inclined surface is 0.03 or more and 0.50 or less.

3. The tape reel according to claim 1, further comprising:
   a tapered surface formed on an opening edge of the through hole on a second inclined surface side and having a shape that expands toward the second inclined surface side.

4. The tape reel according to claim 1,
   wherein a plurality of the through holes are formed at an interval in the peripheral direction, and
   the wall portions are installed upright on both sides of the through hole in the peripheral direction, respectively.

5. A tape cartridge comprising:
   the tape reel according to claim 1; and
   a case that rotatably supports the tape reel and accommodates the tape reel and a tape wound around the tape reel.

* * * * *